2 Sheets—Sheet 1.

C. WATTS.

SIGNAL LIGHT.

No. 10,565. Reissued Feb. 24, 1885.

Witnesses.

Henry Frankfurter.

H. C. McArthur

Inventor.

Charles Watts per. H. Harrison

Attorney

N. PETERS, Photo-Lithographer, Washington, D. C.

C. WATTS.

SIGNAL LIGHT.

No. 10,565. Reissued Feb. 24, 1885.

Witnesses.

Henry Trautfunder.

H. C. McArthur

Inventor.

Charles Watts per. N. Harrison

Attorney.

N. PETERS, Photo-Lithographer, Washington, D. C.

UNITED STATES PATENT OFFICE.

CHARLES WATTS, OF LOGANSPORT, INDIANA.

SIGNAL-LIGHT.

SPECIFICATION forming part of Reissued Letters Patent No. 10,565, dated February 24, 1885.

Original No. 303,900, dated August 19, 1884. Application for reissue filed December 20, 1884.

*To all whom it may concern:*

Be it known that I, CHARLES WATTS, a citizen of the United States, residing at Logansport, in the county of Cass and State of Indiana, have invented certain new and useful Improvements in Signal-Lights, of which the following is a specification, to wit:

This invention relates to an improvement in signal-lights; and it consists in a case divided into a series of separate compartments having glass panels of various colors and a series of removable lamps adapted to be shifted from one compartment to another at pleasure, substantially as hereinafter more fully set forth, and pointed out in the claims.

In order to enable others skilled in the art to which my invention appertains to make and use the same, I will now proceed to describe its construction and operation, referring to the accompanying drawings, in which—

Figure 1:
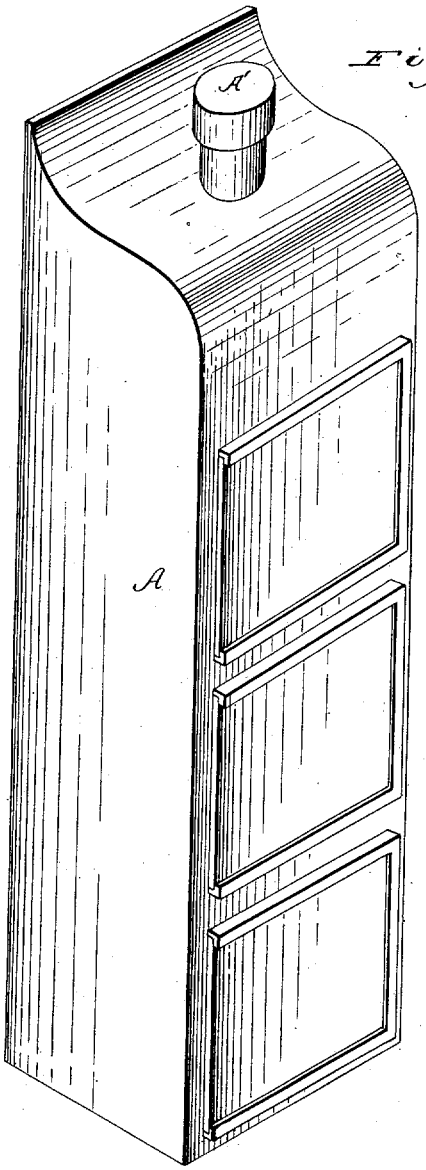
Figure 2:
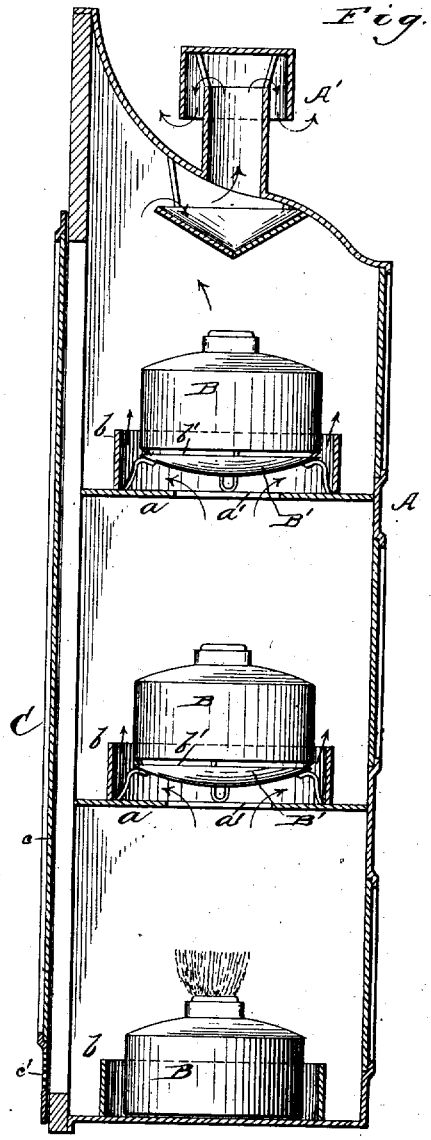
Figure 3:
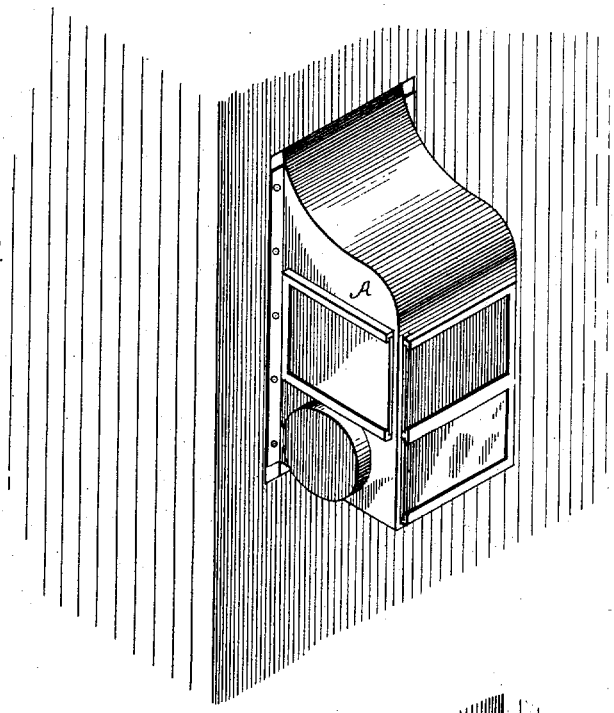
Figure 4:
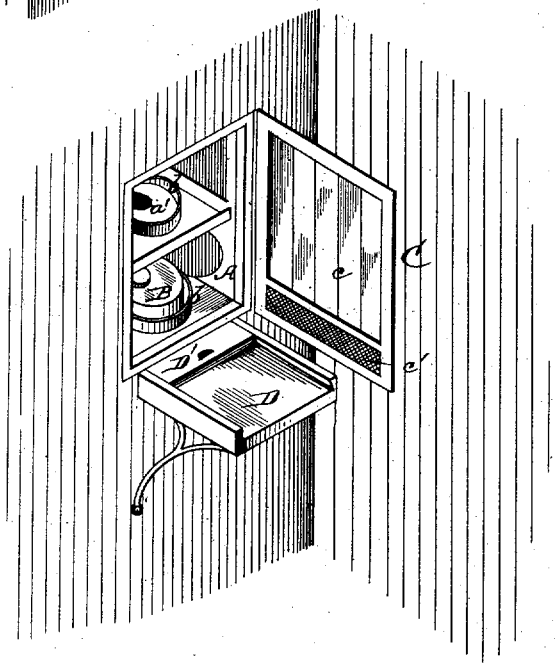

Figure 1 is a perspective view of one of my signal-cases; Fig. 2, a vertical section of the same; and Figs. 3 and 4 are views showing a special application of the device to the rear of a car, the former being an outside and the latter an inside view of the car with the signal-lamp attached.

A represents a case, of sheet metal or other suitable material, divided into a series of compartments by partitions *a a*. It is obvious that these compartments may be arranged either vertically or horizontally, as may be required by the kinds of signals used. In the drawings a vertical arrangement is shown, and the compartments are connected by an opening, *a'*, in their floors or partitions, through which the smoke and hot air are conducted off to the chimney A' at the top. Each compartment is provided upon one or more sides with a glass panel, each of which is intended to be of a different color, and also with a removable lamp, B.

To serve the double purpose of keeping the lamp in place and preventing the reflection of light from one compartment to the other through the openings *a'*, I provide each compartment with a circular flange, *b*, as represented in the drawings, and the lamps B are provided with a shield, B', having an air-space, *b'*, between it and the bottom of the lamp, to prevent undue heating from the lamp below it.

Access is gained to the device by a door, C, hinged upon its rear side, and provided with a panel, *c*, of white glass, and a perforated portion, *c'*, to supply air.

While the device is intended for general signaling purposes by placing one or more of the lamps in the compartments, and thus showing one or more colored lights in the desired relation to each other to represent given signals, it is especially adapted for use upon railroad-trains. It is usual to display upon the rear car of a train a lamp or lantern showing a red light to the rear and green at the side while running, and if the train is "side-tracked" at any point this is changed for a green rear light and white side light. To do this the lantern must be removed from the cage in which it is contained and either turned around or another substituted to show the proper signals. In Figs. 3 and 4, which show my device adapted to this purpose, is represented a frame having two divisions, one above the other, and arranged with colored glass, lamp-sockets, &c., exactly as I have already described it. A lamp placed in the lower compartment shows a red rear and green side light, as is desired for running, while upon running upon a side track it is only necessary to shift the lamp from one compartment to the other to change the signal, as already stated. To prevent these lights from being knocked off in switching about the yard or in passing trains, &c., as will often happen, I secure the case upon a slide, D, resting in a grooved bracket, D', upon the inside of the car, and upon entering the yard the case is drawn inside the car out of the way.

This device is not only used for "tail-lights" upon a train, but is also applicable upon the engine to what are known as "classification signals," and the glass properly arranged for this purpose.

It will be observed that the glass door C serves to partially light the car or cab in which it is placed, and the attendant therefore has his attention at once called to any accident to the lamps by blowing out or other causes.

The whole device is very simple, and adapted to give a series of signals without changing the glass or removing the case from its position.

I am aware that it is not new to construct a case with two panels and a movable bottom upon which the lamp is placed, and by which it is moved to a position in front of either panel; but this is defective, in that it cannot use more than one lamp at a time, and when in the lowest position nothing prevents the illumination of both panels at once, thereby causing a confusion of signals. This I obviate by constructing a case with independent and entirely separate compartments and a series of removable or interchangeable lamps entirely independent of any operating device, and may therefore produce a series of signals limited only by the number of compartments in the case, and each one of which is clear and positive, and not liable to become confused by the light being reflected from one compartment to the other.

Having thus fully described my invention, what I claim as new, and desire to secure by Letters Patent, is—

1. In a signal device, a case divided into a series of compartments, each provided with one or more panels of colored glass, in combination with a series of independent removable lamps adapted to be placed in any of the compartments, whereby any desired colors or combinations of colors may be had in signaling, substantially as shown and described.

2. In a signal device, a case divided into a series of compartments, one above the other, by partitions having air-openings therein, and a series of glass panels of various colors in the sides of the compartments, in combination with a lamp having a shield arranged below its body, with an air-space between, substantially as and for the purpose set forth.

3. In a signaling device, a case divided into a series of vertically-arranged compartments separated by partitions having air-openings therein, in combination with a series of removable lamps and a guard or flange secured to the partitions around said openings, adapted to both retain the lamp in position and prevent the reflection of the light in a lower compartment from showing through the panels of an upper one, substantially as shown and described.

4. In a signaling device, a room or car having an opening in its side, in combination with a signal-case secured over this opening, and means for projecting it through or withdrawing it within the side of the car, room, or cab, substantially as and for the purpose set forth.

5. In a signaling device, the car or room having an opening in its side, and the grooved bracket D′, secured below it, in combination with a signal-case divided into compartments having colored-glass panels and a series of removable lamps, and secured upon the slide D, and the white-glass door C, all constructed and arranged to operate substantially as and for the purpose set forth.

6. In a signaling device, a signal-case having two or more independent compartments, each provided with one or more glass panels, in combination with a single lamp adapted to be removed from one compartment to the other to alter the signal, substantially as described and shown, and for the purpose set forth.

CHARLES WATTS.

Witnesses:
W. C. McArthur,
Chas. Kressmann.